Aug. 29, 1950 — C. G. PADEN — 2,520,889
APPARATUS FOR CLEANSING EGGS IN BULK
Filed Oct. 3, 1949

INVENTOR.
Charles G. Paden.
BY Chas. W. Hull
ATTORNEY.

Patented Aug. 29, 1950

2,520,889

UNITED STATES PATENT OFFICE 2,520,889

APPARATUS FOR CLEANSING EGGS IN BULK

Charles G. Paden, Linglestown, Pa.

Application October 3, 1949, Serial No. 119,334

5 Claims. (Cl. 134—139)

The present invention relates to egg processing and more particularly to a novel means for cleansing eggs. This is accomplished by reducing the handling of the eggs to a very minimum, while at the same time taking advantage of characteristics of the eggs and their qualities to enhance and accelerate the cleaning operation.

Prior to one or two years ago, the uniform practice of cleaning freshly laid eggs was to clean them one by one, that is, individually by manually applying a dry brush with an abrasive covering. In other words, eggs were customarily cleaned without liquid, that is "dry cleaned," and the trade, in general, not only frowned upon the use or application of any liquid, but actually preached against it. It was generally accepted that the use of water or other liquid would impair the quality of the eggs.

However, within the past year or two, the application of some limited amount of liquid with a brush applicator has seen some acceptance. Prior to the present invention, therefore, the generous use of a liquid, either in a shower onto the eggs or by immersing the eggs in a bath for a brief period, has been downright "heresy" in the trade. Moreover, the cleaning of eggs in a group or in bulk, rather than one by one, had been unheard of. Accordingly, with the present improvements, the task of cleaning, in this industry has been lightened but, before the acceptance of these improvements, it required painstaking education to overcome deep-rooted theories of "dry cleaning" only. Now, the immersion method and the apparatus of applicant's invention, are accepted as actually improving the quality of the eggs, as set forth hereinafter.

It is a primary object of the improvements to provide a novel apparatus for cleaning eggs in bulk, attended by a minimum of handling and a maximum output.

A further object is to provide a novel, inexpensive and simple mechanism for practicing the improvements, which may be operated without extensive experience.

In achieving these objects, applicant employs an apparatus wherein the eggs are constantly maintained in bulk in a cluster or pile in interengaging relationship. In other words, the surfaces of the eggs are mutually engaged in "shell to shell" relation while the method is being practiced.

A further object is to provide a novel cleansing device whereby the freshness of the eggs is unimpaired, and the temperature of the eggs is partially employed to achieve an improved result.

These and other objects will be apparent, upon reference to the accompanying specifications and drawings, in which.

Figure 4:
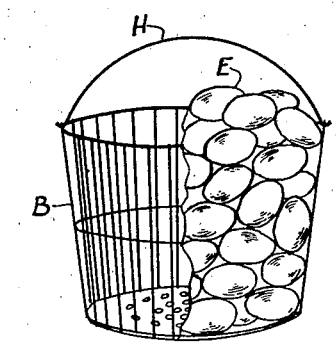
Fig. 4 is a perspective of a conventional egg basket with parts broken away, employed in practicing the improvements.

In Fig. 4, applicant has illustrated a conventional basket B for gathering eggs E. These baskets are commonly used in the trade, i. e., on large poultry farms for harvesting eggs from the nests. They conveniently hold a gross of eggs and it is customary to gather the eggs in such a basket until it is full and then use another basket for gathering more of the eggs, and so on.

The eggs in such baskets are obviously very dirty, due to manure as well as to dirt or dust from the nests. Moreover, the eggs are not only warm but the texture of the shells as well as the quality and duration of freshness are dependent on prompt and immediate treatment and attention. Furthermore, egg yolk from an egg broken by the hen in the nest seems to have special adhesive qualities, and resists removal from adjacent eggs. Applicant's device is designed and adapted to successfully remove this and any foreign matter from the shell.

Numerous devices in the art have failed to achieve commercial success due, it is believed, to the fact that there is too much time lag between the harvested eggs and the cleansing operation. Furthermore, additional handling of individual eggs, to prepare them for feeding to an egg washer has been detrimental in numerous ways.

A basket of warm, newly gathered eggs cannot profitably be left standing to await transportation or feeding to a cumbersome egg washing machine. But past practice has required such waits. In devices of the prior art, the eggs have been customarily delivered to the feed conveyor, initially in wire baskets such as B in Fig. 4, whereupon they must be manually removed in groups of three or four per hand to the belt conveyor. It is obvious that the capacity and speed of such conveyor is limited by the fragile nature of the egg and for that reason, baskets of eggs stand in line, waiting to be "fed" to the washer.

The detrimental effect of this is manifold. As a primary fault, this unavoidable pause permits the eggs to cool. The manure and dirt become more fixed to the shell. The texture of the shell becomes fixed, so that bacteria can more readily penetrate. As explained later herein, the temperature of the egg should not be changed more than once, from nest temperature to atmospheric temperature. This means that the cooling from nest temperature should occur but once so as to preserve the freshness of the egg. However, with large poultry farms, where thousands of eggs are gathered at one time, it is apparent that the eggs which are last fed to the washing machine have already become cooled, and consequently are heated in the cleansing process, to the impairment of the freshness of the product.

Under other circumstances, where egg washing machines are not available, the cleansing is done by hand, necessitating grasping each egg individually. This practice is not only slow and tedious, but is unpleasant and taxing for the hands of the operator, due to the necessity for retaining the hands in the egg bath. A further method recently employed by poultrymen, with limited success, is the use of a garden hose. It is not uncommon for the poultryman to turn a stream of water from a hose, onto a basket of eggs, such as shown in Fig. 4. However, the eggs in the interior seldom if ever are fully cleaned by this method, with the result that they must be washed again, after the basket is emptied.

Having observed these and numerous other short-comings in the field, applicant has devised an apparatus to facilitate and accelerate the cleansing of eggs and at the same time preserve their superior quality.

Figure 1:
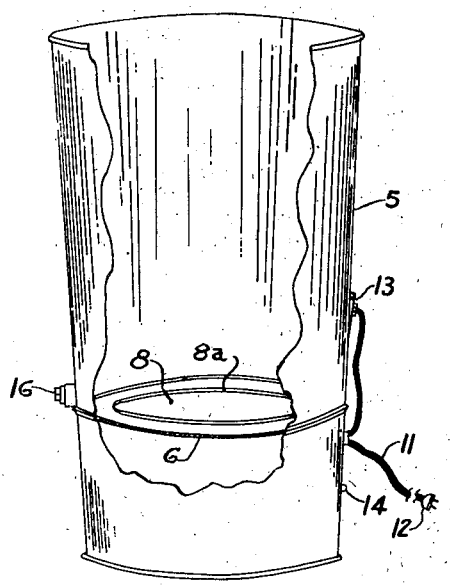
Fig. 1 is a perspective view, with parts broken away of one form of apparatus for use in practicing the improvements.
Figure 2:
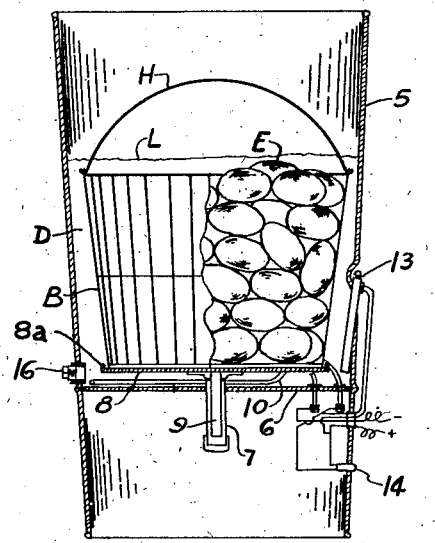
Fig. 2 is a section of the device in Fig. 1, illustrating the complete apparatus for practicing the improvements.

Accordingly, reference is made to Fig. 2, wherein 5 is a tapered container or sleeve having a partition or floor 6, in which a bearing 7 is axially provided. A platform or turntable 8 is provided with an axially depending stud 9, which is removably disposed in bearing 7, in such a manner as to support the turntable in spaced relation above the floor 6. The relation of parts just described is to provide a swiveled turntable 8 immediately above the floor 6. Preferably, the turntables 8 and 21 are provided with peripheral retaining flanges 8a and 21b, respectively, to prevent undue lateral movement of a basket B adapted to be supported thereupon, as will be hereinafter more fully described.

An electrical heating coil 10 is provided along the inside periphery of the floor 6 and slightly above it. This coil has the usual cord 11 and plug 12 for attachment to a source of electrical energy, not shown. A thermostat 13 is connected in the line, with a red signal light 14, adapted to maintain the solution, hereinafter referred to, at any temperature for which the thermostat is set.

A liquid detergent D is placed in the container 5, to any desired level L, preferably to a level to cover the eggs E. To take a typical example, the electrical plug 12 is plugged in and the thermostat is set for 120°. This temperature is preferably maintained throughout. A drain or clean out plug 16 is provided at the bottom of container 5.

Such containers 5, charged with a liquid detergent in the manner just described, are placed at intervals in the barn or other building where the hens' nests are located. A basket B of harvested eggs, as soon as it has been filled to capacity, may be carried by handle H to the container 5. The operator lowers the wire basket B of eggs, about twelve dozen in number, into the detergent D in container 5, until the basket is immersed and rests on turntable 8, at which time the liquid detergent rises to a level L, slightly above the level of the eggs in bulk in the basket, but below the protruding handle H of the basket.

In this condition, as partially illustrated in Fig. 2, the eggs in the basket are in a cluster, i. e., they are mutually supporting each other in shell to shell relationship. The arched surfaces of the eggs are contacting one another on all sides of all the eggs, causing an "arching" or "bridging," whereby the eggs are held immovable, and this mutual support against relative movement reduces breakage or cracking to a very minimum. Moreover, movement of the eggs relative to each other while movement of the basket transpires, unfavorably prolongs the cleansing operation.

The next step in the cleansing comprises the movement of the clustered eggs in bulk as a unit and the movement of the liquid detergent, relative to one another. In the apparatus depicted in Fig. 2, the cluster of eggs is reciprocated as a unit, relative to the liquid. In the embodiment shown in Fig. 3, the cluster of eggs is permitted to rest, while the liquid is set in motion. As an incident to this practice of the method by the apparatus in Fig. 3, the use of the liquid in the manner hereinafter described, causes slow revolving or rotation of the basket containing the eggs.

Referring to the embodiment in Fig. 2, the operator grasps the handle H of basket B by hand. He thereupon twists the basket of eggs back and forth in a reciprocating rotary motion. This causes the cluster of eggs in bulk to move as a unit through the liquid. Both the basket B and platform 8, on which it rests, are reciprocated. It will be seen that, as the eggs are moved in a clockwise direction, during the initial rotation, it tends to urge the liquid in a like direction. However, thereafter, with each reverse rotary movement of the eggs, the current and direction of the liquid lags behind so that the eggs and liquid are constantly moving in opposite directions over one another. As a result, minute eddies are set up in the interstices between the eggs, which serve, not only to accelerate the removal of ordinary dirt, but also to "eat" at the congealed or encrusted manure or egg yolk, much in the manner by which a brook or river eats away its banks. This step in the cleansing is of paramount importance because of the speed with which the manure is removed and for the additional reason that the eggs are thoroughly cleansed without the physical application of a brush or the hands. In existing practice, the necessity, at times, of scrubbing the eggs with the bare hands or with brushes, causes an increase in the breakage and also tends to drive bacteria through the pores of the egg shell into the interior of the egg.

The step above described may be practiced by reciprocating the eggs for several minutes. The buoyancy of the liquid on the basket of eggs tends to reduce the weight somewhat, so that the energy of the operator is conserved. Thereafter, the entire basket B is removed by handle H, and set aside to dry in the basket.

The step of drying is accelerated because of the heat of the detergent, the warmth of the eggs and the access of air to the interstices between the eggs.

The prompt use of this step in the method greatly enhances the quality and saleability of the eggs. Realizing that a warm liquid at about 120° is preferable in the cleansing process, applicant has found that it is detrimental to the eggs, if they are allowed to cool below nest temperature before being cleaned. This is due to the fact that applying the cleaning process after the eggs have been allowed to cool, causes their temperature to be raised again due to the heat of the liquid. When the eggs cool a second time in the drying process, they do not have the same quality or freshness. It is apparent, therefore, by utilizing applicant's device, that the eggs are cleansed while warm from the nests and, therefore, cooling of the eggs occurs only once. In this state, the eggs are found to be of the best quality.

In actual practice, the container or sleeve 5 may be used to cleanse about fifteen to twenty-five baskets of eggs, with one charge of liquid, before being drained, flushed out, and re-charged.

It is significant that, in applicant's apparatus, the dirt or manure is removed more readily due to the assistance given by the warmth of the egg shells.

Some additional advantages of applicant's apparatus over prior art devices include the facility with which a broken egg is disposed of. Applicant is informed that, in existing machines, a broken egg may require complete stoppage for cleaning out the broken egg from the parts, before further cleansing of the remainder can be resumed. In the present invention, a broken egg is washed out of the basket B during the operation of the device and without arresting or interrupting it. The current and counter-current or agitation hereinbefore described drives the contents of the broken egg from the cluster.

In the trade, it is common for hens to produce thick shelled eggs of uniform texture under certain conditions, while, under other conditions, they may produce thin shelled eggs of non-uniform texture. Eggs of the latter type crack very easily, and the loss in breakage is frequently substantial during the cleansing operations heretofore employed. To avoid this, poultrymen have resorted to changing the diet of the hens to include more calcium and thereby strengthen the shells to reduce cracking and breakage.

In apparatus heretofore employed, the use of brushes or other expedients requiring the application of pressure to remove the dirt from the shell has caused a high breakage rate with thin-shell or cracked-shell eggs. In the present invention, however, the apparatus is capable of handling and washing thin shell as well as cracked shell eggs, without loss. This is believed to be attributable to the entire absence of pressure on the shell, as well as the immovable relationship of the eggs which is maintained during the cleansing process.

Moreover, by the use of applicant's apparatus, the eggs are maintained in fresher condition and last longer. The warmth of the detergent enveloping the egg causes the interior of the egg to expand and thereby resist the entrance of bacteria through the pores of the shell. However, in situations where eggs are compelled to wait for the cleansing operation, the bacteria have an opportunity to enter into the pores of the shell and, when brushes or rubbing or pressure of any kind is then applied to the shell, the entrance of bacteria to the interior is greatly facilitated.

Figure 3:
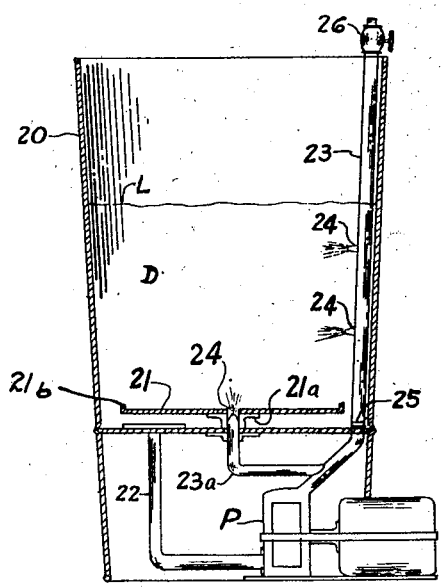
Fig. 3 is a modification, with parts omitted for the sake of clarification.

Upon reference to the modified embodiment, illustrated in Fig. 3, the sleeve or container 20 is also provided with a swiveled platform 21, similar to that illustrated in Fig. 2. A partition, similar to floor or partition 6, in Fig. 2, is provided in the form illustrated in Fig. 3, nearer the lower or reduced end of the sleeve 20, thereby providing a larger upper compartment and a smaller lower compartment. However, the stud 9 is dispensed with, and a collar 21a provided, which surrounds outlet pipe 23a. The heating unit, thermostat and wiring connections, drain, etc., have been omitted, for convenience in illustration. However, it is understood that they are also part of this embodiment. Therefore, in addition to the parts and features of Fig. 2 which are also incorporated in Fig. 3, the latter also includes means for positively circulating the liquid detergent D, relative to the eggs. This comprises a pump P, operated by an electric motor, which pumps the liquid out of the larger upper compartment of sleeve or container 20, through pipe 22, and back again into the upper compartment of sleeve or container 20, through pipes 23, 23a and outlet nozzles 24. The pipe 23 is swiveled at 25 to permit rotation about its axis. The pipe 23 terminates in a valve controlled outlet 26 to which may be connected a utility hose for general use about the premises.

In the use of this apparatus in Fig. 3, the basket B containing eggs to be cleansed is placed in the upper compartment of sleeve or container 20 until it rests on platform 21, with the level of the liquid above the eggs. Upon actuation of the pump P, the liquid is drawn from the bottom of the upper compartment and discharged into the upper compartment, through nozzles 24. As the pipe 23 is swiveled, it may be positioned in various locations. In some instances, it may be positioned so that the liquid from the nozzles 24 will be radially disposed with respect to container 20. In other circumstances, it may be arranged so that the nozzles are directed circumferentially. In either event, the liquid is driven through the eggs, either by direct force onto the eggs, or by a whirling circumferential current.

It is further noteworthy, that the speed of the current, as well as the speed of the revolving basket, can be regulated. This result is derived from the swivel pipe 23, which, as above stated, may be placed in any position about its vertical axis, so that its nozzles 24 may be in substantially vertical plane ranging from a radial position to a circumferential position. In the latter position, the force of the liquid causes the fastest revolution of the water and basket, while the slowest or least revolution is in a position with said nozzles almost radially disposed.

In actual practice in the use of the modification in Fig. 3, just described, I find certain other advantageous results. The force of the streams from the nozzles 24 in the swivel pipe 23, or the revolving movement of the liquid in the circumferential current, or both, have the effect of driving and revolving the basket of eggs and platform 21 about their vertical axes. The speed of revolution of these elements, due to their mass, causes them to lag behind the speed or movement of the whirling current, so that relative motion between the two is preserved.

It will be seen, upon reference to Fig. 3, that both methods of cleansing eggs in bulk may be practiced, i. e., that heretofore described with respect to Fig. 2, as well as that just described above. Accordingly, in the device of Fig. 3, one may manually move the egg basket (with the pump and motor idle) in the manner described earlier herein with respect to Fig. 2, or one may cause the motor and pump to be actuated, and the egg basket is moved without the use of the hands.

It will be observed that the partition 6 in Fig. 2, above which the turntable 8 is mounted, divides the container 5 into an upper washing compartment of greater size and a lower machine compartment of lesser size and within which is housed the bearing or depending stud 9 of the turntable and the heating control mechanism 14. Similarly, in the modified form of the invention disclosed in Fig. 3 of the drawing, the horizontally disposed partition divides the container into an upper washing compartment intended to receive the basket of eggs and liquid detergent and into a lower machine compartment which houses the pumping or fluid circulating device P and associated inlet and outlet as well as the heat control mechanism, not shown.

What I claim as my invention is:

1. An egg washer comprising an open-top upwardly tapered container, a partition in said container located substantially nearer the smaller end than the larger end and dividing said container into a large and a small compartment, a turntable mounted above said partition in said large compartment, said turntable having a peripheral retaining flange and a relatively flat upper surface of a size to receive thereon a conventional egg basket containing eggs to be washed, a liquid discharge pipe disposed upwardly along the inner wall surface of the large compartment, said discharge pipe having a series of axially aligned radially disposed discharge orifices and being rotatable for changing the path of discharge from said orifices from a position radially of said large compartment to a position substantially tangential thereof at either side of the vertical axis whereby the speed and direction of rotation of said basket may be varied, said pipe having a gripping portion by means of which it may be adjusted, a supply pipe swivelly connected to the lower end of said discharge pipe, a pump having an inlet connection from said large compartment and an outlet connection to said supply pipe whereby liquid may be withdrawn from the large compartment and returned thereto through said discharge orifices, means for driving said pump, heating means for heating the circulated liquid, and thermostatic means for controlling the temperature of said heating means.

2. A relatively light-weight and readily portable egg washer comprising an open-top upwardly tapered container, a partition in said container dividing said container into a large and a small compartment, a turntable mounted above said partition in said large compartment, said turntable having a peripheral retaining flange and a relatively flat upper surface of a size to receive thereon an open-mesh wire egg basket containing eggs to be washed, a liquid discharge pipe disposed upwardly along the inner wall surface of the large compartment, said discharge pipe having a plurality of axially aligned discharge orifices and being rotatable for changing the path of discharge from said orifices from a position radially of the large compartment to a position substantially tangential thereof at either side of the vertical axis whereby the speed and direction of rotation of said basket may be varied, said pipe having a gripping portion by means of which it may be adjusted, a supply pipe swivelly connected to said discharge pipe, and means for withdrawing liquid from said large compartment and returning said liquid thereto through said discharge orifices.

3. A relatively light weight and readily portable egg washer comprising an open-top container, a partition in the container dividing said container into a large and a small compartment, a turntable mounted above said partition in said large compartment, said turntable having a relatively flat upper surface of a size to receive thereon an open-mesh wire egg basket containing eggs to be washed, a liquid discharge pipe disposed upwardly along the inner wall surface of the large compartment, said discharge pipe having a plurality of axially aligned spaced discharge orifices and being rotatable whereby the rotative movement of said basket may be varied, a supply pipe swivelly connected to said discharge pipe, and means for withdrawing liquid from said large compartment and returning said liquid thereto through said discharge orifices.

4. A relatively light weight and readily portable egg treating device comprising a container, a partition dividing said container into a treating compartment and a machine compartment, a turntable located adjacent the bottom of said treating compartment and having a relatively flat upper surface of a size to receive and retain thereon an open-mesh wire egg basket containing eggs to be washed, a liquid supply pipe projecting into said treating compartment, a liquid discharge pipe disposed upwardly along the inner wall surface of said treating compartment and swivelly connected to said supply pipe, said liquid discharge pipe having a plurality of axially aligned spaced discharge orifices whereby liquid may be discharged angularly onto said basket of eggs so that the rotative movement of said basket may be varied, and means within said machine compartment for circulating liquid through said discharge pipe.

5. A relatively light weight and readily portable egg washer comprising a container, a partition dividing said container into a washing compartment and a machine compartment, a turntable located adjacent the bottom of said washing compartment and having a relatively flat upper surface of a size to receive and retain thereon an open-mesh egg basket containing eggs to be washed, a liquid supply pipe projecting into said washing compartment, a liquid discharge pipe disposed upwardly along the inner wall surface of said washing compartment and swivelly connected to said supply pipe, said liquid discharge pipe having a plurality of axially aligned spaced discharge orifices whereby liquid may be discharged angularly onto said basket of eggs so that the rotative movement of said basket may be varied, means within said machine compartment for circulating liquid through said discharge pipe, heating means for heating the circulated liquid, and means for controlling the temperature of said heating means.

CHARLES G. PADEN.

REFERENCES CITED

The following references are of record in the file of this patent:

UNITED STATES PATENTS

| Number | Name | Date |
|---|---|---|
| 520,829 | Palmleaf | June 5, 1894 |
| 542,810 | Scott et al. | July 16, 1895 |
| 604,621 | Kunkel | May 24, 1898 |
| 740,642 | Gregg | Oct. 6, 1903 |
| 910,882 | Truesdell | Jan. 26, 1909 |
| 971,658 | Bergstrom | Oct. 4, 1910 |
| 1,379,234 | Williamson | May 24, 1921 |
| 1,633,803 | Ballin | June 28, 1927 |
| 1,932,246 | Kirby | Oct. 24, 1933 |
| 1,961,548 | Caise | June 5, 1934 |
| 2,081,636 | Minors | May 25, 1937 |
| 2,287,141 | Schofield | June 23, 1942 |
| 2,302,809 | Stehlik | Nov. 24, 1942 |